United States Patent [19]
Hartl

[11] Patent Number: 5,417,308
[45] Date of Patent: May 23, 1995

[54] TRAILER FIFTH WHEEL LUBRICATION APPARATUS

[76] Inventor: Toby L. Hartl, 3311 E. 36th St., Spokane, Wash. 99223

[21] Appl. No.: 103,203

[22] Filed: Aug. 9, 1993

[51] Int. Cl.$^6$ ............................................. F01M 11/12
[52] U.S. Cl. .................................. 184/6.4; 184/6.19; 184/28; 184/39; 184/55.1; 184/100; 184/105.3; 184/108; 184/7.3; 280/433
[58] Field of Search ................. 184/5, 6.4, 6.19, 28, 184/29, 39, 55.1, 100, 105.3, 108, 7.2, 7.3, 7.4; 280/433; 92/5 R

[56] References Cited

U.S. PATENT DOCUMENTS

| | | | |
|---|---|---|---|
| 1,465,620 | 8/1923 | Anderson | 184/7.2 |
| 1,732,579 | 10/1929 | Gleason | 184/7.3 |
| 1,982,093 | 11/1934 | Zerk | 184/7.3 |
| 2,305,455 | 12/1942 | Nemetz | 184/7.4 |
| 2,543,784 | 3/1951 | Kyle | 184/6.4 |
| 2,823,768 | 2/1958 | Taylor | 184/7.2 |
| 2,908,898 | 10/1959 | Mueller et al. | 184/7.2 |
| 2,914,630 | 11/1959 | Ralston | 92/5 R |
| 3,367,446 | 2/1968 | Higgins | 184/7.2 |
| 3,463,512 | 8/1969 | Hodgson | 280/433 |
| 3,743,054 | 7/1973 | Jones, Jr. | 280/433 |
| 4,207,564 | 6/1980 | Bakson et al. | 92/5 R |

FOREIGN PATENT DOCUMENTS

| | | | |
|---|---|---|---|
| 2596497 | 10/1987 | France | 280/433 |
| 0055408 | 3/1987 | Japan | 184/6.4 |

Primary Examiner—Edward K. Look
Assistant Examiner—Christopher Verdier

[57] ABSTRACT

A new and improved trailer fifth wheel lubrication apparatus is carried by a truck and includes a fifth wheel assembly which has lubrication channels and fittings for conveying lubricant to an upper surface of the fifth wheel assembly. Lubricant conveyances are connected to the fittings for conveying lubricant to the fifth wheel assembly. A main lubricant supply line is connected to the lubricant conveyances. A lubricant supply assembly is connected to the main lubricant supply line. A power assembly is connected to the lubricant supply assembly and forces discharge of lubricant from the lubricant supply assembly into the main lubricant supply line. A control assembly controls flow of power from the power assembly to the lubricant supply assembly. The control assembly includes an actuator assembly located in a cab of the truck. A lubricant distribution assembly is connected to the lubricant conveyances and conveys lubricant to the lubricant conveyances. The main lubricant supply line is connected to the lubricant distribution assembly and conveys lubricant to the lubricant distribution assembly for lubricating the fifth wheel assembly. A lubricant supply indicator assembly may be connected to the lubricant supply assembly and indicates a low level of lubricant supply. An auxiliary, manually powered, lubricant supply assembly may be connected to the main lubricant supply line between the lubricant supply assembly and the fifth wheel assembly.

7 Claims, 4 Drawing Sheets

TRAILER FIFTH WHEEL LUBRICATION APPARATUS

BACKGROUND OF THE INVENTION

1. Field of the Invention

The present invention relates generally to devices used to lubricate the fifth wheel of a trailer, and more particularly to a device especially adapted for lubricating the fifth wheel without disconnecting the trailer from the truck.

2. Description of tile Prior Art

Devices designed to lubricate the sliding connection between a trailer and a truck, known as the fifth wheel, are well known. For example, the following U.S. patents disclose devices for lubrication of the fifth wheel U.S. Pat. Nos. 3,622,173; 3,743,054; 4,541,651; 4,802,554; and 4,913,263. More specifically, U.S. Pat. No. 3,622,173 discloses a fifth wheel that contains it own grease reservoir. Although it is a good idea to have a supply of grease available to the fifth wheel, the administration of the grease is not controlled by positive pressure. In this respect, it would be desirable if a fifth wheel lubrication device were provided that administers grease with positive pressure.

U.S. Pat. No. 3,743,054 discloses a fifth wheel which includes a source of positive pressure for administering grease to the fifth wheel. The source of positive pressure is a cylinder installed next to the fifth wheel that is manually operable. Although it is desirable to administer grease to the fifth wheel under positive pressure, it is undesirable to require manual administration of the grease. Inclement weather conditions and discomfort to an operator can both make it quite inconvenient to manually administer the grease to the fifth wheel. In this respect, it would be desirable if a fifth wheel lubrication device were provided that did not require manual administration of grease to the fifth wheel. Moreover, it would also be desirable if a fifth wheel lubrication device were provided that did not require the user to be exposed to inclement weather as the lubrication device is used.

U.S. Pat. No. 4,541,651 discloses a fifth wheel lubrication system that automatically supplies grease to the fifth wheel under a pressure exerted by a hydrostatic head of grease from an elevated grease reservoir. A disadvantage of this device is that as the grease supply is depleted, the hydrostatic head lessens. Eventually, when the hydrostatic head decreases enough, essentially no pressure is exerted on the grease to permeate the fifth wheel. In this respect, it would be desirable if a fifth wheel lubrication device were provided that did not depend on the continually lessening pressure exerted by a continually lessening hydrostatic head.

U.S. Pat. No. 4,913,263 discloses rupturable grease packets for lubricating fifth wheels. The size of the grease packet is very limited. Moreover, once the packets are ruptured, they are not replenishable. In this respect, it would be desirable if a fifth wheel lubrication device were provided which did not use rupturable, unreplenishable packets.

U.S. Pat. No. 4,802,554 may be of interest for a grease applying method which employs a rotating part that mechanically picks up a quantity of grease and wipes the grease up against a surface to be greased. One disadvantage of using this device with a fifth wheel is that this device requires quite a number of moving parts and would be very inconvenient to install and operate in the vicinity of the fifth wheel. In this respect, it would be desirable if a fifth wheel lubrication device were provided which adequately lubricated the fifth wheel without employing a lot of moving parts.

There are certain specific driving conditions in which it would be desirable to add grease to the fifth wheel. Such conditions include driving around curves, making turns, and backing up. In this respect, it would be desirable if a fifth wheel lubrication device were provided that permitted addition of grease to the fifth wheel as the truck and trailer go around curves, make turns, and backing up.

The fifth wheel presents a relatively large surface requiring lubrication. If a lubricant is applied unevenly to the surface, then inadequate lubrication may occur. In this respect, it would be desirable if there were a fifth wheel lubrication device which provided for a substantially even supply of lubricant to the fifth wheel.

To avoid problems of inclement weather and to be able to apply lubricant to the fifth wheel even as the rig is being driven, it would be desirable if a fifth wheel lubrication device were controllable from inside the cab of the truck. In that positive pressure is desirable over gravity flow for administering lubricant to the fifth wheel, it would be desirable if administration of lubricant to the fifth wheel were controlled by a source of positive pressure that was controllable from inside the truck.

Most trucks, especially ones with air brakes, have on board air pumps. In this respect, it would be desirable if a fifth wheel lubrication device were provided which utilized an on board air pump to power the lubrication device.

Lubrication devices for fifth wheels of trailers have a common characteristic with many lubrication devices. That is, they can run out of lubricant without a user being aware of the lubricant depleted status. In this respect, it would be desirable if a fifth wheel ;lubrication device were provided which provided a signal that indicated a low level of lubricant in a lubricant supply.

Thus, while the foregoing body of prior art indicates it to be well known to use lubrication devices for a fifth wheel of a trailer, the prior art described above does not teach or suggest a trailer fifth wheel lubrication apparatus which has the following combination of desirable features: (1) administers grease with positive pressure; (2) does not require manual administration of grease to the fifth wheel; (3) does not use rupturable, unreplenishable grease-containing packets; (4) does not depend on the continually lessening pressure exerted by a continually lessening hydrostatic head; (5) adequately lubricates the fifth wheel without employing a lot of moving parts; (6) does not require the user to be exposed to inclement weather as the lubrication device is used; (7) permits addition of grease to the fifth wheel as the truck and trailer go around curves, make turns, and are backed up; (8) provides for a substantially even supply of lubricant to the fifth wheel; (9) is controllable from inside the cab of the truck; (10) administers lubricant to the fifth wheel by means of a source of positive pressure that is controllable from inside the truck; (11) utilizes an on board air pump to power the lubrication device; and (12) provides a signal that indicates a low level of lubricant in a lubricant supply. The foregoing desired characteristics are provided by the unique trailer fifth wheel lubrication apparatus of the present invention as will be made apparent from the following description thereof.

Other advantages of the present invention over the prior art also will be rendered evident.

SUMMARY OF THE INVENTION

To achieve the foregoing and other advantages, the present invention, briefly described, provides a new and improved trailer fifth wheel lubrication apparatus which is carried by a truck and includes a fifth wheel assembly which has lubrication channels and one or more fittings for conveying lubricant to an upper surface of the fifth wheel assembly. One or more lubricant conveyances are connected to the fittings for conveying lubricant to the fifth wheel assembly. A main lubricant supply line is connected to the lubricant conveyances and conveys lubricant to the lubricant conveyances. A lubricant supply assembly is connected to the main lubricant supply line and conveys lubricant to the main lubricant supply line.

A power assembly is connected to the lubricant supply assembly and forces discharge of lubricant from the lubricant supply assembly into the main lubricant supply line. A control assembly controls flow of power from the power assembly to the lubricant supply assembly. The control assembly includes an actuator assembly, located in a cab of the truck, for actuating the control assembly. A lubricant distribution assembly may be connected to the lubricant conveyances and conveys lubricant to the lubricant conveyances. The main lubricant supply line is connected to the lubricant distribution assembly and conveys lubricant to the lubricant distribution assembly.

The lubricant supply assembly includes a housing member and a slidable piston member contained within the housing member. The slidable piston member defines two variable volume chambers within the housing member. The two variable volume chambers include a lubricant-containing chamber and a pressurized-air-containing chamber. The lubricant-containing chamber is connected to the main lubricant supply line for supplying lubricant to the main lubricant supply line. The pressurized-air-containing chamber is connected to a source of pressurized air for driving the slidable piston member and forcing lubricant in the pressurized-air-containing chamber into the main lubricant supply line for delivery to the lubrication channels in the fifth wheel assembly.

The power assembly includes a pneumatic pressure line connected between the pressurized-air-containing chamber and a pressurized air source for conveying air pressure from the pressurized air source to the pressurized-air-containing chamber.

The control assembly includes an air pressure control valve assembly for controlling flow of air pressure through the pneumatic pressure line from the pressurized air source to the pressurized-air-containing chamber, and the actuator assembly, is in electrical circuit with the electrically operated valve operator for operating the valve assembly.

The air pressure control valve assembly includes a valve assembly located in-line within the pneumatic pressure line. An electrically operated valve operator is connected to the valve assembly and controls operation of the valve assembly.

A lubricant supply indicator assembly may be connected to the lubricant supply assembly and indicates a low level of lubricant supply. The lubricant supply indicator assembly includes an electrical switch assembly which may be operated by a slidable piston member in the lubricant supply assembly when the slidable piston member reaches a low level of lubricant supply. An indicator assembly, is located in a cab of the truck, and indicates actuation of the electrical switch assembly for signalling low level of lubricant supply in the lubricant supply assembly.

An auxiliary, manually powered, lubricant supply assembly may be connected to the main lubricant supply line between the lubricant supply assembly and the fifth wheel assembly. The auxiliary, manually powered, lubricant supply assembly includes a manually operated lubricant pump unit, an auxiliary lubricant line connected to the manually operated lubricant pump unit, and a T-connector located in line in the main lubricant supply line. The auxiliary lubricant line is connected to the T-connector, such that auxiliary lubricant from the manually operated lubricant pump unit passes through the auxiliary lubricant line and the T-connector to the main lubricant supply line and the fifth wheel assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved trailer fifth wheel lubrication apparatus which has all of the advantages of the prior art and none of the disadvantages.

It is another object of the present invention to provide a new and improved trailer fifth wheel lubrication apparatus which may be easily and efficiently manufactured and marketed.

It is a further object of the present invention to provide a new and improved trailer fifth wheel lubrication apparatus which is of durable and reliable construction.

An even further object of the present invention is to provide a new and improved trailer fifth wheel lubrication apparatus which is susceptible of a low cost of manufacture with regard to both materials and labor, and which accordingly is then susceptible of low prices of sale to the consuming public, thereby making such trailer fifth wheel lubrication apparatus available to the buying public.

Still yet a further object of the present invention is to provide a new and improved trailer fifth wheel lubrication apparatus which administers grease with positive pressure.

Still another object of the present invention is to provide a new and improved trailer fifth wheel lubrication apparatus that does not require manual administration of grease to the fifth wheel.

Yet another object of the present invention is to provide a new and improved trailer fifth wheel lubrication apparatus which does not use rupturable, unreplenishable grease-containing packets.

Even another object of the present invention is to provide a new and improved trailer fifth wheel lubrication apparatus that does not depend on the continually lessening pressure exerted by a continually lessening hydrostatic head.

Still a further object of the present invention is to provide a new and improved trailer fifth wheel lubrication apparatus which adequately lubricates the fifth wheel without employing a lot of moving parts.

Yet another object of the present invention is to provide a new and improved trailer fifth wheel lubrication apparatus that does not require the user to be exposed to inclement weather as the lubrication device is used.

Still another object of the present invention is to provide a new and improved trailer fifth wheel lubrication apparatus which permits addition of grease to the fifth wheel as the truck and trailer go around curves, make turns, and are backed up.

Yet another object of the present invention is to provide a new and improved trailer fifth wheel lubrication apparatus which provides for a substantially even supply of lubricant to the fifth wheel.

Still a further object of the present invention is to provide a new and improved trailer fifth wheel lubrication apparatus that is controllable from inside the cab of the truck.

Yet another object of the present invention is to provide a new and improved trailer fifth wheel lubrication apparatus which administers lubricant to the fifth wheel by means of a source of positive pressure that is controllable from inside the truck.

Still a further object of the present invention is to provide a new and improved trailer fifth wheel lubrication apparatus that utilizes an on board air pump to power the lubrication device.

Yet another object of the present invention is to provide a new and improved trailer fifth wheel lubrication apparatus which provides a signal that indicates a low level of lubricant in a lubricant supply.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved trailer fifth wheel lubrication apparatus embodying the principles and concepts of the present invention will be described.

Turning initially to FIGS. 1-4, there is shown a first exemplary embodiment of the trailer fifth wheel lubrication apparatus of the invention generally designated by reference numeral 10. In its preferred form, trailer fifth wheel lubrication apparatus 10 is carried by a truck 11 and includes a fifth wheel assembly 12 which has lubrication channels 14 (approximately ⅛ inch deep) and one or more fittings 16 for conveying lubricant to an upper surface 13 of the fifth wheel assembly 12. One or more lubricant conveyances 18 are connected to the fittings 16 for conveying lubricant to the fifth wheel assembly 12. A main lubricant supply line 22 is connected to the lubricant conveyances 18 and conveys lubricant to the lubricant conveyances 18. A lubricant supply assembly 24 is connected to the main lubricant supply line 22 and conveys lubricant to the main lubricant supply line 22. The fittings 16 are positioned adjacent to a perimeter 90 of the fifth wheel assembly 12, and the lubrication channels 14 radiate from the fittings 16.

Figure 2:
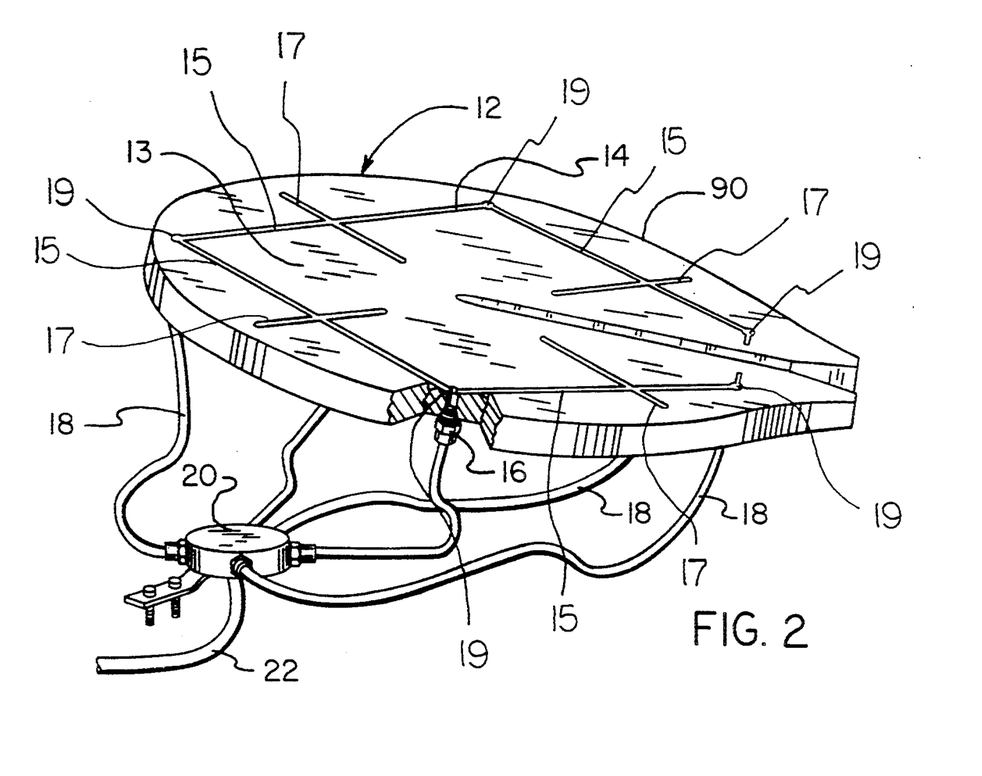
FIG. 2 is an enlarged, perspective view, partially in cross-section, of the fifth wheel assembly portion of the embodiment of the invention shown in FIG. 1.

The lubrication channels 14 are distributed on the upper surface 13 of the fifth wheel assembly 12 in an arrangement wherein fittings 16 adjacent to the perimeter 90 of the fifth wheel assembly 12 define channel corners 19 at which adjoining lubrication channels 14 contact each other, wherein the lubrication channels 14 include first channel portions 15 which extend between a pair of the channel corners 19, and wherein second channel portions 17 of the lubrication channels 14 perpendicularly intersect the first channel portions 15 of the lubrication channels 14 mid-way between a pair of channel corners 19.

Figure 1:
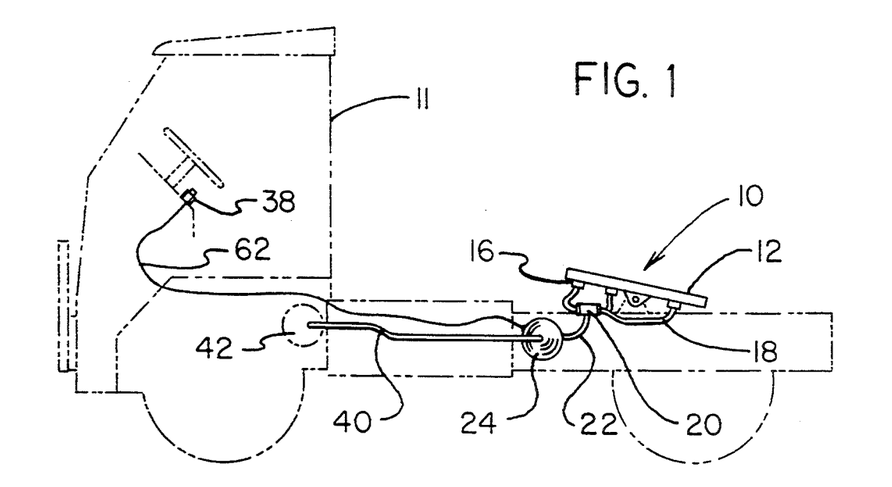
FIG. 1 is a side view showing a first preferred embodiment of the trailer fifth wheel lubrication apparatus of the invention installed in a truck.
Figure 3:
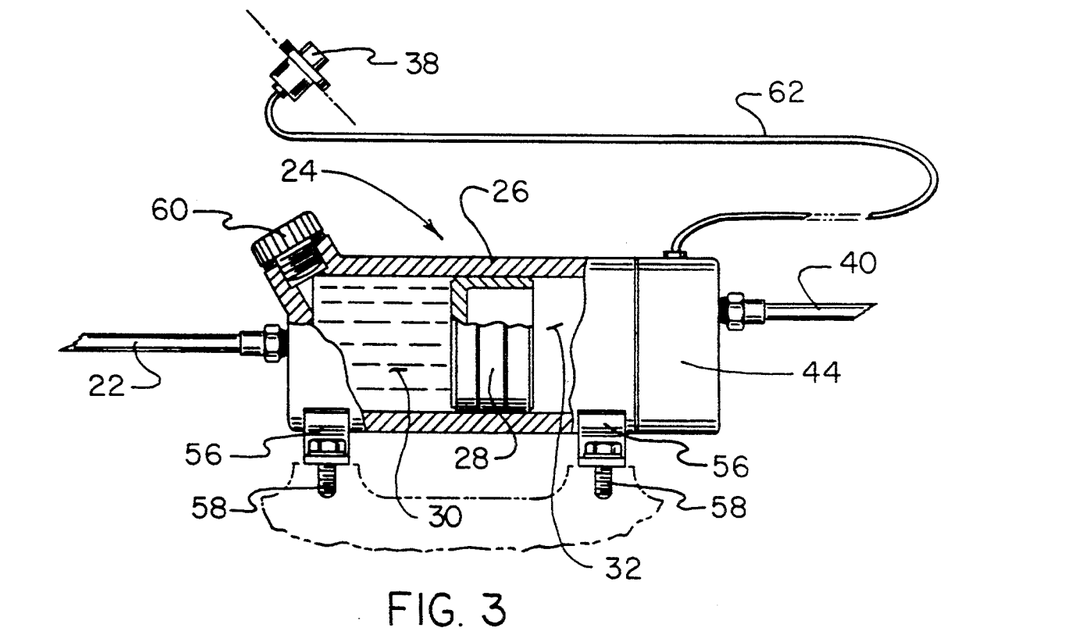
FIG. 3 is an enlarged side view, partially in cross-section, of the lubricant supply assembly or the embodiment of the invention shown in FIG. 1.
Figure 4:
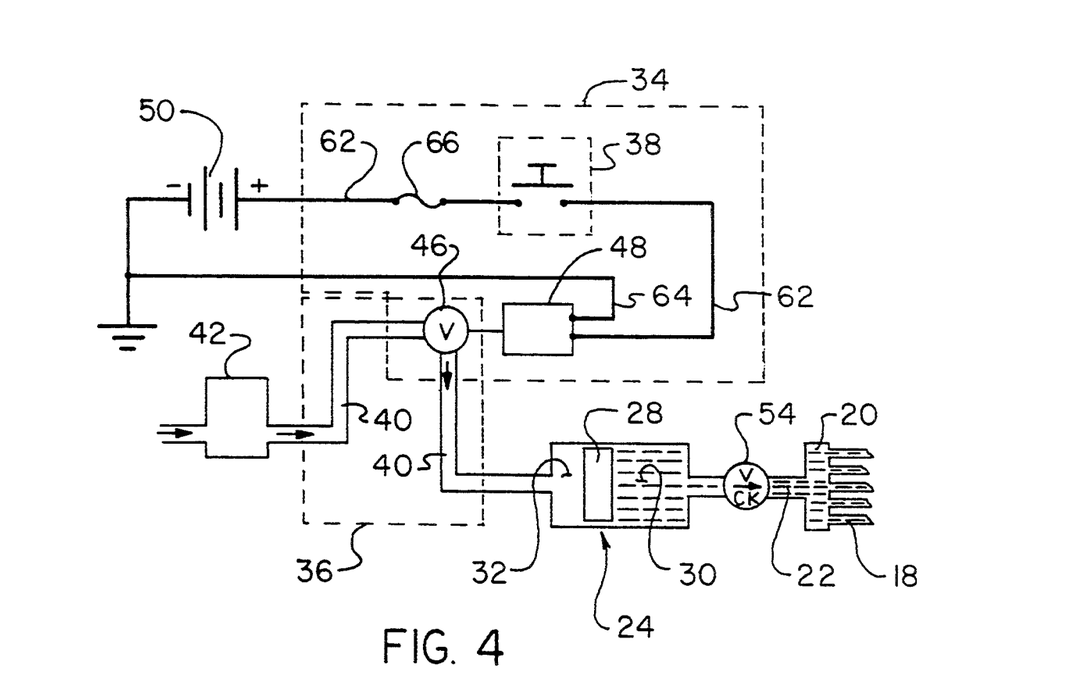
FIG. 4 is a schematic diagram, combining electrical and pneumatic components, of the embodiment of the invention shown in FIG. 1.

A power assembly 36 is connected to the lubricant supply assembly 24 and forces discharge of lubricant from the lubricant supply assembly 24 into the main lubricant supply line 22. A control assembly 34 controls flow of power from the power assembly 36 to the lubricant supply assembly 24. The control assembly 34 includes an actuator assembly 38, located in a cab of the truck 11, for actuating the control assembly 34. A lubricant distribution assembly 20 is connected to the lubricant conveyances 18 and conveys lubricant to the lubricant conveyances 18. The main lubricant supply line 22 is connected to the lubricant distribution assembly 20 and conveys lubricant to the lubricant distribution assembly 20.

The lubricant supply assembly 24 includes a housing member 26 and a slidable piston member 28 contained within the housing member 26. The slidable piston member 28 defines two variable volume chambers within the housing member 26. The two variable volume chambers include a lubricant-containing chamber 30 and a pressurized-air-containing chamber 32. The lubricant-containing chamber 30 is connected to the main lubricant supply line 22 for supplying lubricant to the main lubricant supply line 22. The pressurized-air-containing chamber 32 is connected to a source of pressurized air for driving the slidable piston member 28 and for forcing lubricant in the pressurized-air-containing chamber 32 into the main lubricant supply line 22 for delivery to the lubrication channels 14 in the fifth wheel assembly 12.

The lubricant-containing chamber 30 is provided with a removable cap 60. When the cap 60 is removed, more lubricant can be added to the lubricant-containing chamber 30. The housing member 26 is fixed to the truck 11 using brackets 56 and bolts 58.

The power assembly 36 includes a pneumatic pressure line 40 connected between the pressurized-air-containing chamber 32 and a pressurized air source 42 for conveying air pressure from the pressurized air source 42 to the pressurized-air-containing chamber 32. The pressurized air source 42 is shown as an air reservoir. The air reservoir derives its pressurized air from an air compressor that is already on board the truck 11 for other purposes, such as supplying air to the air brakes. A line (not shown) is tapped into an output line from the on board compressor to supply pressurized air to the air reservoir 42.

The control assembly 34 includes an air pressure control valve assembly 44 for controlling flow of air pressure through the pneumatic pressure line 40 from the pressurized air source 42 to the pressurized-air-containing chamber 32. An actuator assembly 38, shown as a push-button switch 38, is in electrical circuit with the electrically operated valve operator 48 for operating the valve assembly 46. The truck battery 50 is used to electrically power the electrically operated valve operator 48. One electrical conductor 62 runs from the positive post of the battery 50, through the push-button switch 38, to one connection on the electrically operated valve operator 48. Another electrical conductor 64 runs from the electrical ground to the other post of the electrically operated valve operator 48. When the push-button 38 is pressed, the electrical circuit is completed through the electrically operated valve operator 48 which actuates the valve assembly 46. A protective fuse 66 is present in electrical line 62.

As shown in FIG. 4, the air pressure control valve assembly 44 (shown in FIG. 3) includes a valve assembly 46 located in-line within the pneumatic pressure line 40. An electrically operated valve operator 48 is connected to the valve assembly 46 and controls operation of the valve assembly 46.

In operation, when the push-button 38 is pressed by the driver, the electrically operated valve operator 48 is actuated. This causes the valve assembly 46 to open which permits pressurized air in the pressurized air source 42 to exert pressure, through pneumatic pressure line 40, into the pressurized-air-containing chamber 32 and onto the slidable piston member 28. The slidable piston member 28 exerts pressure upon the lubricant contained in the lubricant-containing chamber 30, and lubricant is forced out of the lubricant-containing chamber 30 into the main lubricant supply line 22. Lubricant under pressure moves through the main lubricant supply line 22, past check valve 54 into the lubricant distribution assembly 20, into the lubricant conveyances 18, past the fittings 16, and into the lubrication channels 14 of the fifth wheel assembly 12.

Figure 5:
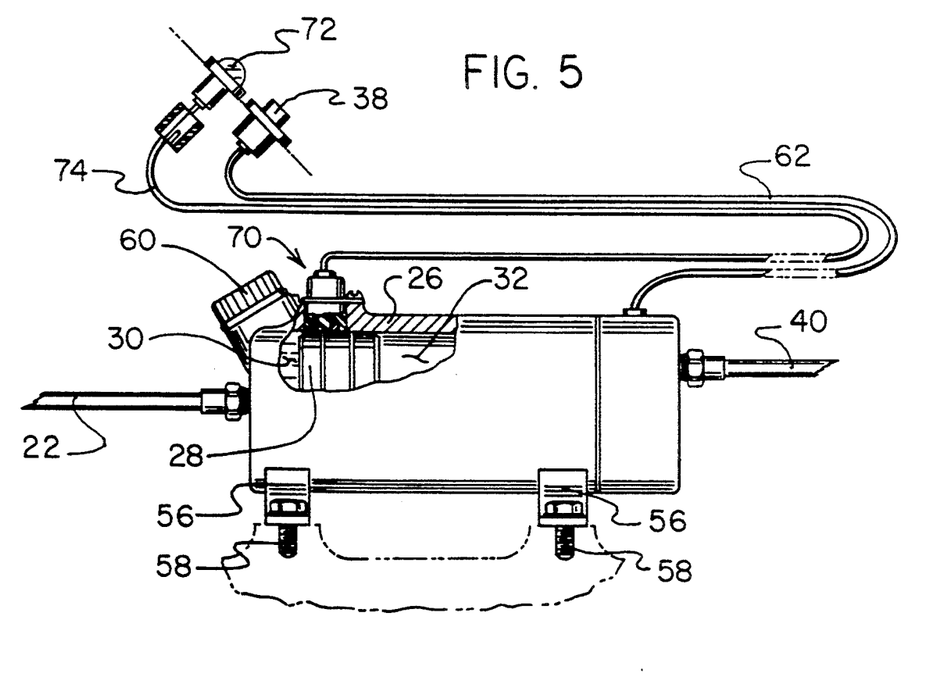
FIG. 5 is an enlarged side view, partially in cross-section, of a lubricant supply assembly of a second embodiment of the invention wherein a signal is provided for indication of a low lubricant level in the lubricant supply.
Figure 6:
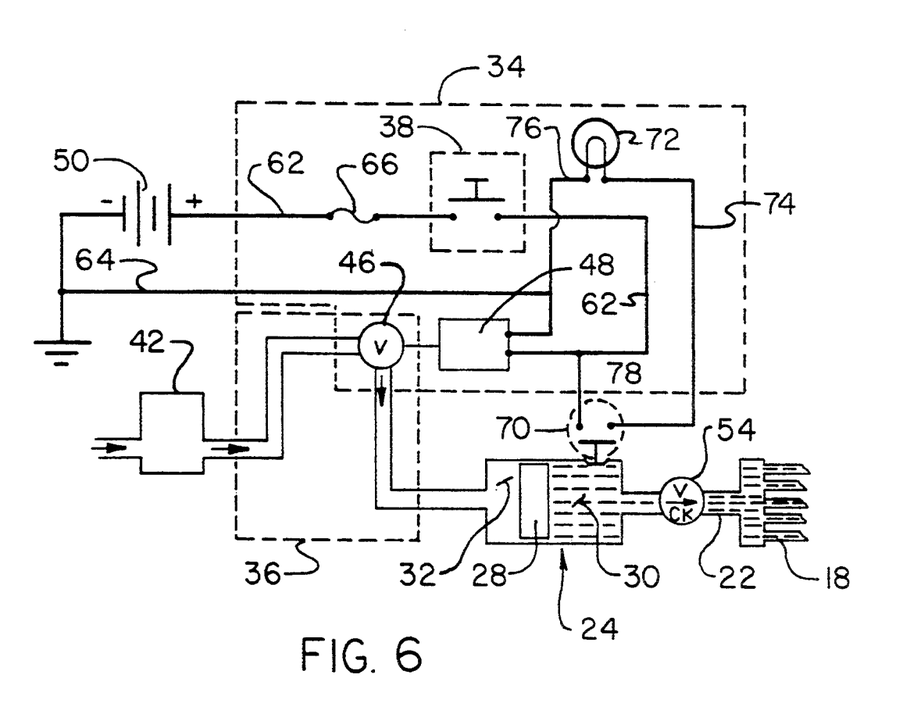
FIG. 6 is a schematic diagram, combining electrical and pneumatic components, of the embodiment of the invention shown in FIG. 5.

Turning to FIGS. 5–6, a second embodiment of the invention is shown. Reference numerals are shown that correspond to like reference numerals that designate like elements shown in the other figures. In addition, a lubricant supply indicator assembly is connected to the lubricant supply assembly 24 and indicates a low level of lubricant supply.

The lubricant supply indicator assembly includes an electrical switch assembly 70 which is operated by a slidable piston member 28 in the lubricant supply assembly 24 when the slidable piston member 28 reaches a low level of lubricant supply. An indicator assembly 72, shown as lamp 72, is located in a cab of the truck 11 and indicates actuation of the electrical switch assembly 70 for signalling low level of lubricant supply in the lubricant supply assembly 24. Electrical line 74 connects the electrical switch assembly 70 to the lamp 72. Electrical line 76 connects the lamp 72 to the electrical ground. Electrical line 78 connects the electrical switch assembly 70 to electrical line 62 which is connected through push-button switch 38 to the positive post of the battery 50.

In operation, when the slidable piston member 28 actuates the electrical switch assembly 70, an electrical circuit is completed, and lamp 72 glows indicating low level of lubricant in the lubricant supply assembly 24.

Figure 7:
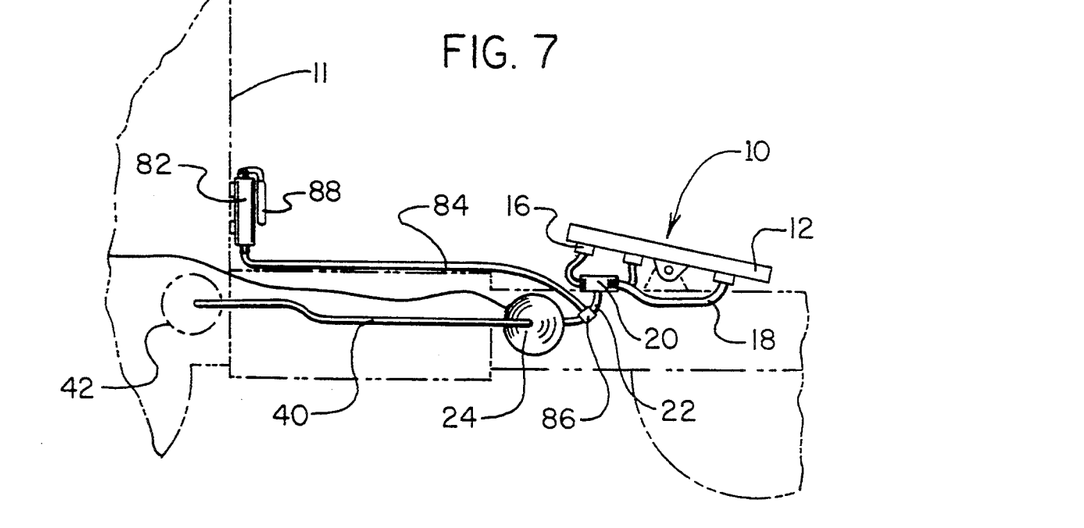
FIG. 7 is a side view showing a third preferred embodiment of the trailer fifth wheel lubrication apparatus of the invention installed in a truck, wherein an auxiliary, manually powered lubricant supply assembly is also provided.
Figure 8:
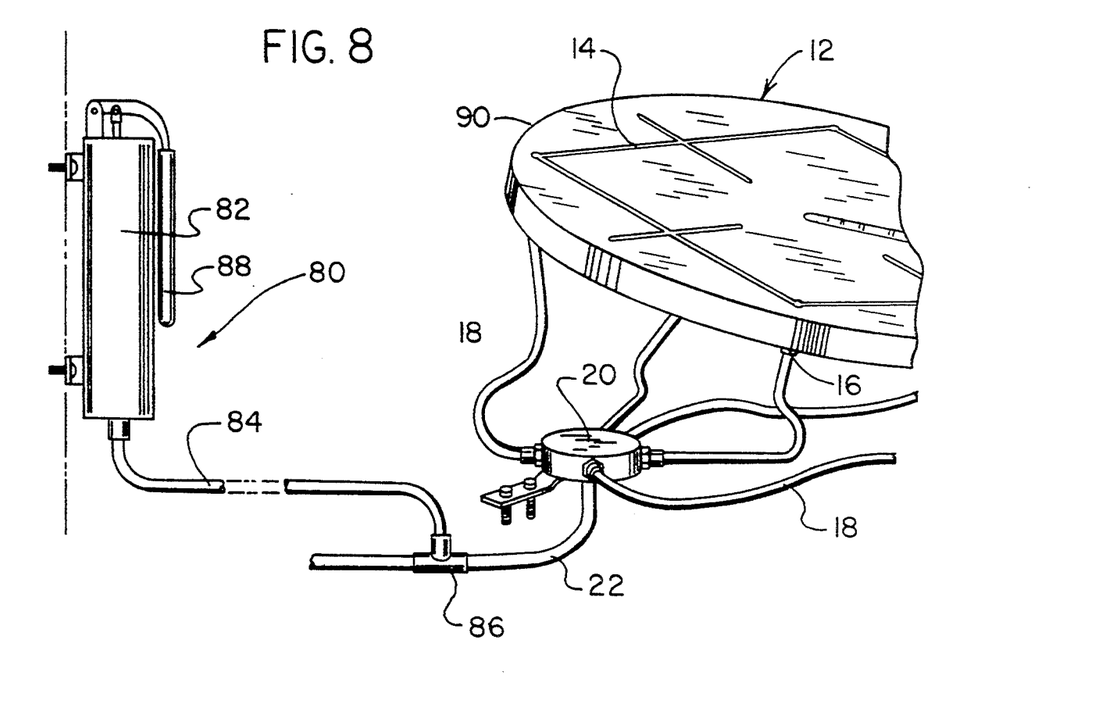
FIG. 8 is an enlarged side view of the auxiliary, manually powered lubricant supply assembly shown in FIG. 7.

Turning to FIGS. 7–8, a third embodiment of the invention is shown. Reference numerals are shown that correspond to like reference numerals that designate like elements shown in the other figures. In addition, an auxiliary, manually powered, lubricant supply assembly 80 is connected to the main lubricant supply line 22 between the lubricant supply assembly 24 and the fifth wheel assembly 12. The auxiliary, manually powered, lubricant supply assembly 80 is provided as a backup in case of failure of the lubricant supply assembly 24 or in case the lubricant supply in the lubricant supply assembly 24 is depleted. The auxiliary, manually powered, lubricant supply assembly 80 can be used until the lubricant supply assembly 24 is recharged with lubricant. The auxiliary, manually powered, lubricant supply assembly 80 includes a manually operated lubricant pump unit 82, an auxiliary lubricant line 84 connected to the manually operated lubricant pump unit 82, and a T-connector 86 located in line in the main lubricant supply line 22. The auxiliary lubricant line 84 is connected to the T-connector 86, such that auxiliary lubricant from the manually operated lubricant pump unit 82 passes through the auxiliary lubricant line 84 and the T-connector 86 to the main lubricant supply line 22 and the fifth wheel assembly 12. The manually operated lubricant pump unit 82 includes a handle 88 and is attached to the body of the truck 11 by suitable brackets and fasteners.

Most of the components of the trailer fifth wheel lubrication apparatus of the invention can be made from inexpensive and durable metal, plastic, or rubber materials.

It is apparent from the above that the present invention accomplishes all of the objects set forth by providing a new and improved trailer fifth wheel lubrication apparatus that is low in cost, relatively simple in design and operation, and which may advantageously be used to administer grease to the fifth wheel with positive pressure. With the invention, a trailer fifth wheel lubrication apparatus is provided which does not require manual administration of grease to the fifth wheel. With the invention, a trailer fifth wheel lubrication apparatus is provided which does not use rupturable, unreplenishable grease-containing packets. With the invention, a trailer fifth wheel lubrication apparatus is provided which does not depend on the continually lessening pressure exerted by a continually lessening hydrostatic head. With the invention, a trailer fifth wheel lubrication apparatus is provided which adequately lubricates the fifth wheel without employing a lot of moving parts. With the invention, a trailer fifth wheel lubrication apparatus is provided which does not require the user to be exposed to inclement weather as the lubrication device is used.

Also, with the invention, a trailer fifth wheel lubrication apparatus is provided which permits addition of grease to the fifth wheel as the truck and trailer go around curves, make turns, and are backed up. With the invention, a trailer fifth wheel lubrication apparatus is provided which provides for a substantially even supply of lubricant to the fifth wheel. With the invention, a trailer fifth wheel lubrication apparatus is provided which is controllable from inside the cab of the truck. With the invention, a trailer fifth wheel lubrication apparatus is provided which administers lubricant to the fifth wheel by means of a source of positive pressure that is controllable from inside the truck. With the invention, a trailer fifth wheel lubrication apparatus is provided which utilizes an on board air pump to power the lubrication device. With the invention, a trailer fifth wheel lubrication apparatus is provided which provides a signal that indicates a low level of lubricant in a lubricant supply.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the United States is as follows:

1. A trailer fifth wheel lubrication apparatus carried by a truck, said apparatus comprising:
   a fifth wheel assembly, connected to the truck, including a plurality of lubrication channels and a plurality of fittings for conveying lubricant to an upper surface of said fifth wheel assembly,
   a plurality of lubricant conveyances, connected to said fittings, for conveying lubricant to said fifth wheel assembly,
   a lubricant distribution assembly, connected to said lubricant conveyances, for conveying lubricant to said lubricant conveyances,
   a main lubricant supply line, connected to said lubricant distribution assembly, for conveying lubricant to said lubricant distribution assembly,
   a lubricant supply assembly, connected to said main lubricant supply line, for conveying lubricant to said main lubricant supply line,
   power assembly means, connected to said lubricant supply assembly, for forcing discharge of lubricant from said lubricant supply assembly into said main lubricant supply line,
   control assembly means for controlling flow of power from said power assembly means to said lubricant supply assembly, said control assembly means including manually operated actuator assembly means, located in a cab of the truck, for actuating said control assembly means,
   wherein said lubrication channels are distributed on said upper surface of said fifth wheel assembly in an arrangement wherein said fittings are adjacent to a perimeter of said fifth wheel assembly and define channel corners at which adjoining lubrication channels contact each other, wherein said lubrication channels include first channel portions which extend between a pair of said channel corners, and wherein second channel portions of said lubrication channels perpendicularly intersect said first channel portions of said lubrication channels midway between a pair of channel corners.

2. The apparatus described in claim 1 wherein said lubricant supply assembly includes:
   a housing member, and
   a slidable piston member contained within said housing member, said slidable piston member defining two variable volume chambers within said housing member, said two variable volume chambers including a lubricant-containing chamber and a pressurized-air-containing chamber, said lubricant-containing chamber being connected to said main lubricant supply line, said pressurized-air-containing chamber being connected to a source of pressurized air for driving said slidable piston member and forcing lubricant in said lubricant-containing chamber into said main lubricant supply line for delivery to said lubrication channels in said fifth wheel assembly.

3. The apparatus described in claim 2 wherein said power assembly means include:
a pneumatic pressure line connected between said pressurized-air-containing chamber and a pressurized air source for conveying air pressure from the pressurized air source to said pressurized-air-containing chamber.

4. The apparatus described in claim 2 wherein:
said control assembly means include an air pressure control valve assembly for controlling flow of air pressure through said pneumatic pressure line from the pressurized air source to said pressurized-air-containing chamber, and
said actuator assembly means, is in electrical circuit with said electrically operated valve operator for operating said valve assembly.

5. The apparatus described in claim 4 wherein said air pressure control valve assembly includes a valve assembly located in-line within said pneumatic pressure line and an electrically operated valve operator, connected to said valve assembly for controlling operation of said valve assembly.

6. The apparatus described in claim 1, further including:
a lubricant supply indicator assembly, connected to said lubricant supply assembly, for indicating a low level of lubricant supply.

7. The apparatus described in claim 6 wherein said lubricant supply indicator assembly includes:
an electrical switch assembly which is operated by a slidable piston member in said lubricant supply assembly when said slidable piston member reaches a low level of lubricant supply, and
an indicator assembly, located in the cab of the truck, for indicating actuation of said electrical switch assembly for signalling low level of lubricant supply in said lubricant supply assembly.

* * * * *